United States Patent
Jacobson et al.

(10) Patent No.: US 10,705,947 B2
(45) Date of Patent: Jul. 7, 2020

(54) IMPAIRMENT IN AN APPLICATION TEST EXECUTION

(71) Applicant: MICRO FOCUS LLC, Santa Clara, CA (US)

(72) Inventors: Shlomo Jacobson, Yehud (IL); Yoran Shamir, Yehud (IL); Don Moore, Yehud (IL)

(73) Assignee: MICRO FOCUS LLC, Santa Clara, CA (US)

(*) Notice: Subject to any disclaimer, the term of this patent is extended or adjusted under 35 U.S.C. 154(b) by 0 days.

(21) Appl. No.: 16/069,661

(22) PCT Filed: Jan. 19, 2016

(86) PCT No.: PCT/US2016/013856
§ 371 (c)(1),
(2) Date: Jul. 12, 2018

(87) PCT Pub. No.: WO2017/127047
PCT Pub. Date: Jul. 27, 2017

(65) Prior Publication Data
US 2019/0034324 A1  Jan. 31, 2019

(51) Int. Cl.
*G06F 11/36* (2006.01)

(52) U.S. Cl.
CPC ...... *G06F 11/3688* (2013.01); *G06F 11/3664* (2013.01)

(58) Field of Classification Search
CPC .......................... G06F 11/3664; G06F 11/3688
USPC ......................................................... 717/124
See application file for complete search history.

(56) References Cited

U.S. PATENT DOCUMENTS

| 6,678,250 | B1* | 1/2004 | Grabelsky ............... H04L 43/06 370/241 |
| 7,269,157 | B2 | 9/2007 | Kllinker et al. |
| 7,430,179 | B2 | 9/2008 | Towns et al. |
| 7,821,955 | B2 | 10/2010 | Morikuni et al. |
| 8,824,490 | B2 | 9/2014 | Samuels et al. |
| 2003/0204784 | A1 | 10/2003 | Jorapur |
| 2004/0064760 | A1* | 4/2004 | Hicks ................ H04L 41/5009 714/43 |
| 2007/0168734 | A1 | 7/2007 | Vasile |
| 2008/0172576 | A1 | 7/2008 | Kusko et al. |
| 2009/0198482 | A1 | 8/2009 | Schumacher |
| 2010/0238828 | A1 | 9/2010 | Russell |
| 2011/0244440 | A1* | 10/2011 | Saxon ..................... G09B 7/02 434/362 |

(Continued)

FOREIGN PATENT DOCUMENTS

JP   2001051864 A   2/2001

OTHER PUBLICATIONS

Chauhan, M., Measurement and Analysis of Networking Performance in Virtualised Environments, Jun. 30, 2014, Aalto University, 85 pages.

(Continued)

*Primary Examiner* — Ryan D. Coyer

(57) ABSTRACT

A method includes, in a distributed environment for a test execution of an application, measuring impairment in the distributed environment; and, during the application test execution, subtracting the measured impairment from a test impairment that is artificially introduced into the application test execution based on a test profile.

20 Claims, 6 Drawing Sheets

(56) References Cited

U.S. PATENT DOCUMENTS

2013/0060933 A1\* 3/2013 Tung .................. G06F 11/3495
  709/224
2013/0329578 A1 12/2013 Groves et al.
2016/0277272 A1\* 9/2016 Peach .................. H04L 43/106

OTHER PUBLICATIONS

International Search Report & Written Opinion received in PCT Application No. PCT/US2016/013856, Sep. 21, 2016, 10 pages.
Stefanelli, C., et al., Network Conditions Monitoring in the Mockets Communications Framework, Aug. 25, 2007, IEEE Xplore, 7 pages.
Strowes, S.D., Passively Measuring TCP Round-trip Times, Oct. 28, 2013, Networks, 12 pages.

\* cited by examiner

US 10,705,947 B2

IMPAIRMENT IN AN APPLICATION TEST EXECUTION

BACKGROUND

Applications may be developed for a wide range of computerized devices including individual computers, networked computer systems and mobile phones. Within each such context, applications may be developed for many different uses. During development, an application or program may be tested, perhaps repeatedly, to ensure proper execution, identify and eliminate bugs and optimize usability. Developers may learn how to improve the application under development from such tests.

BRIEF DESCRIPTION OF THE DRAWINGS

The accompanying drawings illustrate various implementations of the principles described herein and are a part of the specification. The illustrated implementations are merely examples and do not limit the scope of the claims.

Throughout the drawings, identical reference numbers designate similar, but not necessarily identical, elements.

DETAILED DESCRIPTION

Figure 1:
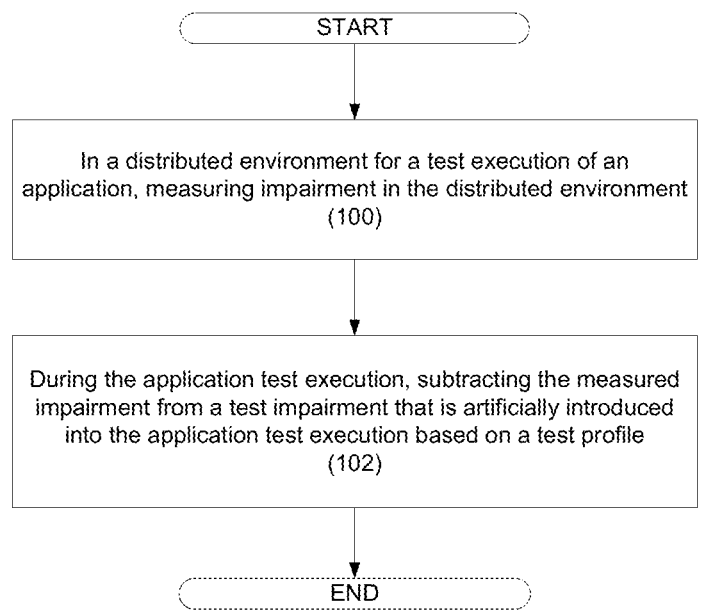
FIG. 1 is a flowchart showing an example method of compensating for actual impairment in a test execution employing artificial impairment, consistent with the disclosed implementations.

As indicated above, applications may be developed for many devices, in different contexts, to serve any number of uses. During development, applications may be tested, perhaps repeatedly, to ensure proper execution, identify and eliminate bugs and optimize usability. Developers may document and may compare different tests to learn how to improve the application.

Some applications operate in a distributed environment meaning that, during execution of the application, data is exchanged among different devices over a data network. The application may be composed of components installed and operating on different electronic devices connected by a network, where the different components communicate with each other to perform the purpose of the application. Alternatively, an application may simply interact with other devices or applications on other devices over a network when executing.

In any distributed environment including a data network, where data is exchanged across the network, there will naturally be some level of impairment in the transmission of the data. For example, if the network is congested with significant amounts of traffic, the transmission of data across the network will be slowed as compared to the speed of transmission without congestion or traffic. This delay in transmitting and receiving data is known as latency.

Additionally, when data is transferred across a data network, the data is typically divided into a series of smaller blocks. Each smaller block of data is included in a separate data packet for transmission. The data is then retrieved from the packets and reassembled by the recipient. During transmission, it occasionally occurs that a packet is lost and not delivered to the intended recipient. Consequently, the data, as received, may be incomplete due to a missing packet. The amount or rate of packet loss that occurs is another type of impairment in the distributed environment.

As used herein and in the following claims, the term "impairment" will refer to latency, a rate of packet loss or a combination of both. As described, impairment is naturally experienced by an actual data network. Additionally, impairment may be introduced to network virtualization, as described below.

As used herein and in the following claims, the term "test impairment" refers to an impairment that has been specified as part of the conditions under which an application test execution is to be conducted. This "test impairment" or an "artificial impairment" is artificially introduced by the test system to achieve the desired test conditions. As explained herein, the test impairment may be adjusted from the values specified to compensate for actual impairment in the distributed test environment. The adjusted test impairment is referred to as the "artificial impairment." Thus, "test impairment" and "artificial impairment" are distinguished from the "actual" or "measured" impairment of a distributed test environment.

As used herein and in the following claims, the term "data packet" or "packet" refers to any packetized subset of data being transmitted over a data network. For example, a data packet may be a stream of octets sent over the network for which some response is anticipated. The term "acknowledgment message" refers to a corresponding response from a recipient acknowledging that a data packet was received.

Data packets may be transmitted using a specific protocol. Examples of such a protocol include, but are not limited to, the Transmission Control Protocol (TCP) or Internet Control Message Protocol (ICMP). In the TCP, the acknowledgement message is a TCP Acknowledgement (ACK) message. In the ICMP, a packet includes an echo request (ping), and the acknowledgment message is a corresponding echo reply.

When testing an application that will eventually operate in a distributed environment including a data network with potential impairment, the test system may intentionally introduce impairment, such as latency and/or packet loss, into the test execution to better simulate a real operating environment in which the application under test will execute. This is referred to as network virtualization.

However, if the test system is itself a distributed environment, the test system may already experience some actual and natural impairment, including latency and/or packet loss. This actual impairment, if present, adds to any artificial impairment artificially introduced by the test system to compound the impairment being considered in the application test execution. To address this distortion of the conditions for the test execution, the present specification describes measuring the actual impairment in a distributed test environment and subtracting that impairment from an artificial impairment being intentionally introduced into the test execution so that the result is a total impairment as desired for conducting the test execution. Because of the nature of the network and volatility of network conditions, these measurements and adjustments may be occurring constantly during the test execution.

In the following description, for purposes of explanation, specific details are set forth in order to provide a thorough understanding of the disclosure. It will be apparent, however, to one skilled in the art that examples consistent with the present disclosure may be practiced without these specific details. Reference in the specification to "an implementation," "an example" or similar language means that a particular feature, structure, or characteristic described in connection with the implementation or example is included in at least that one implementation, but not necessarily in other implementations. The various instances of the phrase "in one implementation" or similar phrases in various places in the specification are not necessarily all referring to the same implementation.

FIG. 1 is a flowchart showing an example method of compensating for actual impairment in a test execution employing artificial impairment, consistent with the disclosed implementations. In this example, the method includes, in a distributed environment for a test execution of an application, measuring impairment in the distributed environment; and during the application test execution, subtracting the measured impairment from a test impairment that is artificially introduced into the application test execution based on a test profile. The measuring may be done at test execution and updated with every packet sent.

As noted above, this example may apply when an application is under development and is being tested. The test environment for the application is a distributed environment including a number of different electronic devices communicating over a data network. Any such distributed environment has the potential to naturally experience impairment, including both latency and packet loss.

Consequently, the example method of FIG. 1 begins with measuring (100) any naturally-occurring impairment in this distributed environment. This impairment may be latency, measured by an amount of time required to transmit data on the network, or packet loss, measured by a rate at which packets are lost, or a combination of both latency and packet loss.

When measuring latency in the distributed environment, the method may include recording a transit timestamp for a data packet forwarded in the distributed environment; and, upon receipt of an acknowledgment message for that data packet, calculating a round-trip time based on the recorded transit timestamp. This round-trip time is measure of the latency in the environment. The round-trip time can be compared to earlier-measured round-trip times to determine whether latency is increasing or decreasing. The measured round-trip time can also be compared to an expected round-trip time standard to categorize the degree of latency the distributed environment is experiencing.

When measuring a packet loss rate in the distributed environment, the method may include recording a transit timestamp for a data packet forwarded in the distributed environment; and, upon failing to receive an acknowledgment message for that data packet within a pre-configured, time-out, recording a packet loss event. The number of packet loss events compared to the total number of packets transmitted gives a packet loss rate.

Once impairment has been measured, including any additional quantification of the impairment, this measured impairment is subtracted (102) from a test impairment that is artificially introduced into the application test execution based on a test profile. For example, if the test profile specifies that the test is to be conducted under conditions including a latency of 50 microseconds (ms) and the measured latency is 30 ms, the test system will introduce an additional 20 ms of artificial latency to total the 50 ms specified by the test profile. In another example, if the test profile specifies a packet loss rate of 0.5% and the measured rate of packet loss is 0.25%, the test system will introduce additional packet loss of 0.25% to produce the packet rate loss of 0.5% specified by the test profile.

The test profile indicates the impairment conditions under which the developer wishes to test the application. As indicated here, the method of FIG. 1 achieves the impairment conditions specified by the test profile so that the application test conditions are as desired, regardless of the addition of actual impairment factors from a real distributed test environment.

As will be described in further detail below, some implementations may include repeatedly measuring the impairment in the distributed environment and adjusting the test impairment throughout the test execution.

Figure 2:
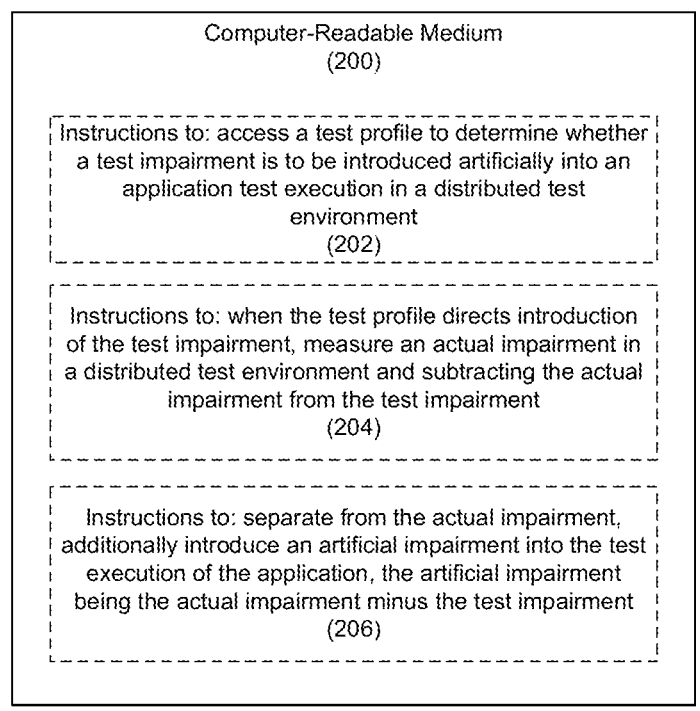
FIG. 2 is a diagram of an example non-transitory computer-readable medium with instructions for compensating for actual impairment in a test execution employing artificial impairment, consistent with the disclosed implementations.

FIG. 2 is a diagram of an example non-transitory computer-readable medium with instructions for compensating for actual impairment in a test execution employing artificial impairment, consistent with the disclosed implementations. In this example, the computer-readable medium includes instructions that, when executed, cause a processor of an application test device to: access (202) a test profile to determine whether a test impairment is to be introduced artificially into an application test execution in a distributed test environment; when the test profile directs introduction of the test impairment, measure (204) an actual impairment in a distributed test environment and subtracting the actual impairment from the test impairment; and, separate from the actual impairment, additionally introduce (206) an artificial impairment into the test execution of the application, the artificial impairment being the actual impairment minus the test impairment.

As in the example of FIG. 1, the instructions further cause the processor to: record a transit timestamp for a data packet forwarded in the distributed environment; upon receipt of an acknowledgment message for that data packet, calculate a round-trip time based on the recorded transit timestamp; and determine the measured latency based on the calculated round-trip time; and upon failure to receive an acknowledgement message within a pre-configured timeout, record a packet loss event.

In some implementations, the application under test may involve the transmission of data between a client and a server that are connected through the network. From a point in the network, then, we can consider impairment on the client-side of the data transmission or on the server-side of the data transmission. Consequently, the test impairment can be specified and the actual impairment compensated for on either or both of a client-side or a server-side of data transmission. In some implementations, the test profile indicates whether a test impairment is to be applied for server-side transmission independent of a client-side, for client-side transmission independent of a server-side or for both sever- and client-side transmission. In some implementations, this may mean the computer-readable medium includes instructions further cause the processor to: measure a first impairment to a client from a network virtualization point in the distributed environment; and measure a second impairment to a server from a network virtualization point in the distributed environment. In some implementations, there may be multiple servers involved in the test execution, each with its own impairment measurement and compensation.

Because the actual impairment in the distributed environment can vary over time as conditions change, the described implementations can adjust for actual impairment dynamically on an on-going basis while an application test execution is conducted. Alternatively, the actual impairment used to adjust the test impairment can be an average of measured impairments over a period of time. For example, a number of sessions may be conducted in which application testing occurs. In such a case, the instructions on the computer-readable medium further cause the processor to: for each of a number of sessions, measure the impairment in the distributed environment; calculate an average impairment from the number of sessions; and use the average impairment to determine the actual impairment to be subtracted from the test impairment.

In some such implementations, the instructions of the computer-readable medium further cause the processor to, for each session: measure a first impairment to a client from a network virtualization point in the distributed environment; measure a second impairment to a server from a network virtualization point in the distributed environment; and combine the first and second impairments before calculating the average impairment. Where this is the case, the instructions may further cause the processor to use half of the average impairment as the actual impairment to be subtracted from the test impairment used to send a packet either to the client or the server.

Figure 3:
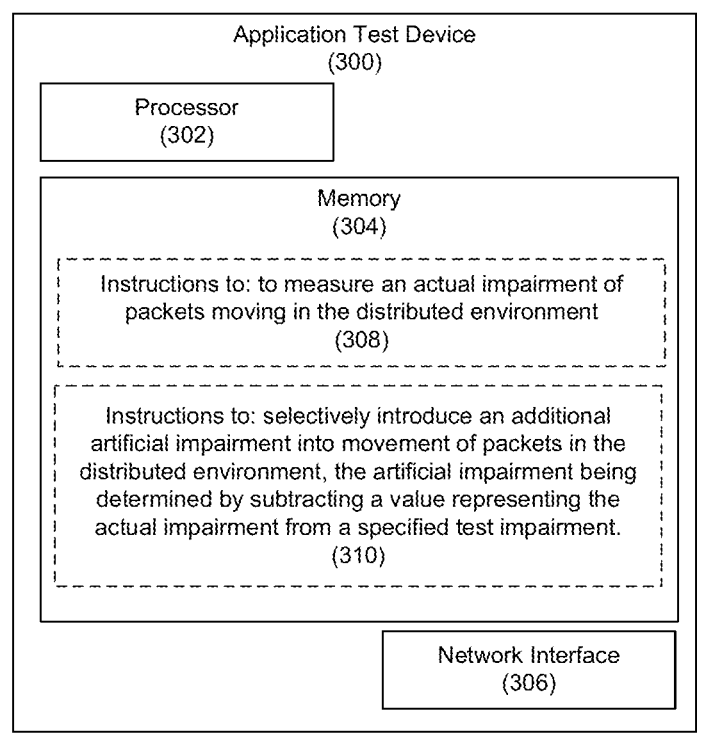
FIG. 3 is a diagram of an example application test device for compensating for actual impairment in a test execution employing artificial impairment, consistent with the disclosed implementations.

FIG. 3 is a diagram of an example application test device for compensating for actual impairment in a test execution employing artificial impairment, consistent with the disclosed implementations. In this example, the device for testing an application in a distributed environment includes: a processor (302) for executing a test of the application; a memory (304) for communicating with the processor and storing instructions for executing the test of the application; and a network interface (310) for executing the test of the application in the distributed environment. The processor (302), with the instructions, is programmed to measure (308) an actual impairment of packets moving in the distributed environment; and, during the application test execution, selectively introduce (310) an additional artificial impairment into movement of packets in the distributed environment, the artificial impairment being determined by subtracting a value representing the actual impairment from a specified test impairment.

Figure 4:
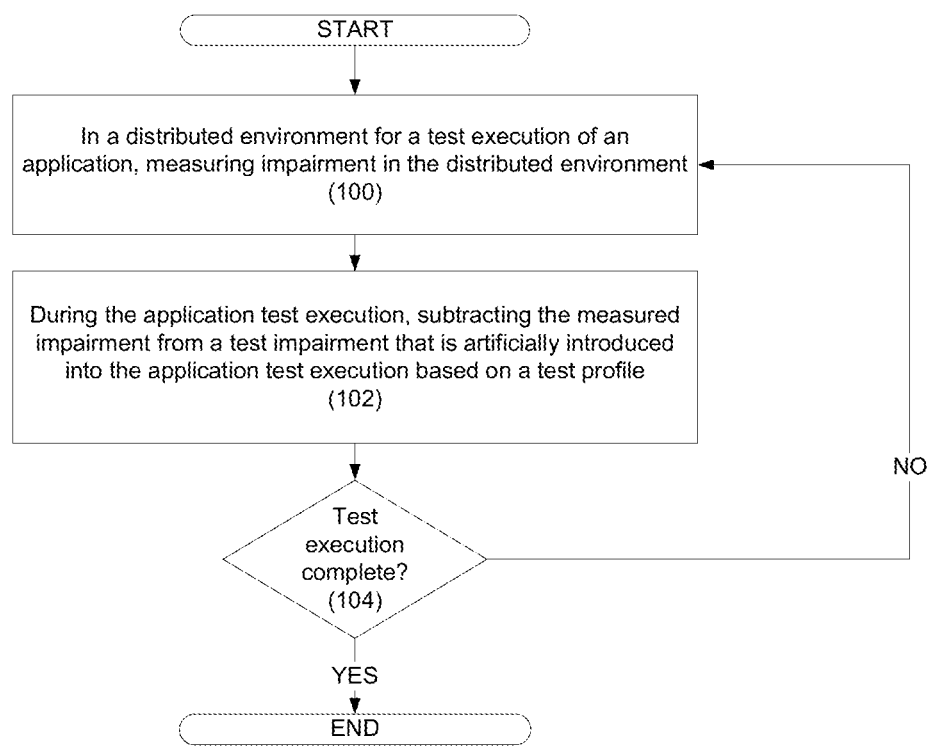
FIG. 4 is a flowchart showing another example method of compensating for actual impairment in a test execution employing artificial impairment, consistent with the disclosed implementations.

FIG. 4 is a flowchart showing another example method of compensating for actual impairment in a test execution employing artificial impairment, consistent with the disclosed implementations. As noted above, in some implementations, the testing system is repeatedly measuring the impairment in the distributed environment and adjusting the test impairment throughout the test execution. An example of this is shown in FIG. 4.

As shown in FIG. 4, this example method may include, in a distributed environment for a test execution of an application, measuring (100) impairment in the distributed environment. During the application test execution, this example method includes subtracting (102) the measured impairment from a test impairment that is artificially introduced into the application test execution based on a test profile.

A determination (104) is them made as to whether the test execution is complete. If the test execution is not complete, the actual impairment in the distributed environment is again measured (100). This newly-measured actual impairment is then used to adjust the test impairment being applied, for example, by subtracting the measured impairment from a test impairment that is artificially introduced during the application test execution. If the test execution is complete, the method terminates.

Figure 5:
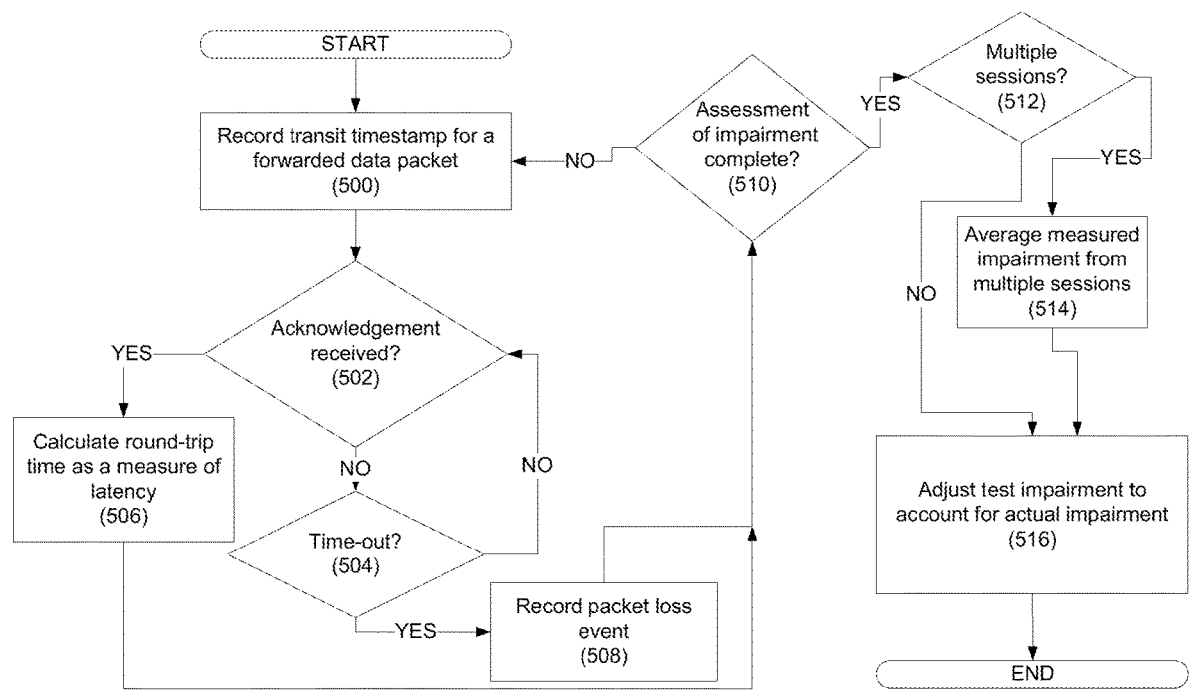
FIG. 5 is a flowchart showing another example method of compensating for actual impairment in a test execution employing artificial impairment, consistent with the disclosed implementations.

FIG. 5 is a flowchart showing another example method of compensating for actual impairment in a test execution employing artificial impairment, consistent with the disclosed implementations. As described herein, the actual impairment in a distributed environment is measured for use in adjusting a test impairment being artificially applied as an artificial impairment. To achieve this, the test system records (400) a transit timestamp for a data packet that is forwarded. The test system then waits for and determines (502) whether an acknowledgment of that packet is received.

If the acknowledgement is not received prior to a time-out limit (504), then a packet loss event is recorded (508). If the acknowledgment is received, the test system calculates (506) a round-trip time as a measure of latency. As noted above, this may be done for either or both of a client-side and a server-side. Thus, the method may include measuring a first impairment to a client from a network virtualization point in the distributed environment; and measuring a second impairment to a server from a network virtualization point in the distributed environment.

In some implementations, this may conclude (510) the assessment of impairment, and the actual impairment measured may then be used to adjust (516) a test impairment to provide an artificial impairment applied to the application test execution. In other implementations, this does not complete the assessment of impairment (510), and the actual impairment is again measured, as indicated above, so a dynamic or averaged impairment is available to adjust the test impairment.

If impairment is measured for a number of multiple sessions (512), the test system may then average (514) the measured impairments from the multiple sessions. In such an example, the method applied may include, for each of a number of sessions, measuring the impairment in the distributed environment; calculating an average impairment from the number of sessions; and using the average impairment to determine the impairment to be subtracted from the test impairment. This may include for each session: measuring a first impairment to a client from a network virtualization point in the distributed environment; measuring a second impairment to a server from a network virtualization point in the distributed environment; and combining the first and second impairment before calculating the average impairment. Where this is the case, the method may further include using half of the average impairment as the measured impairment to be subtracted from the test impairment used to send a packet either to the client or the server.

Figure 6:
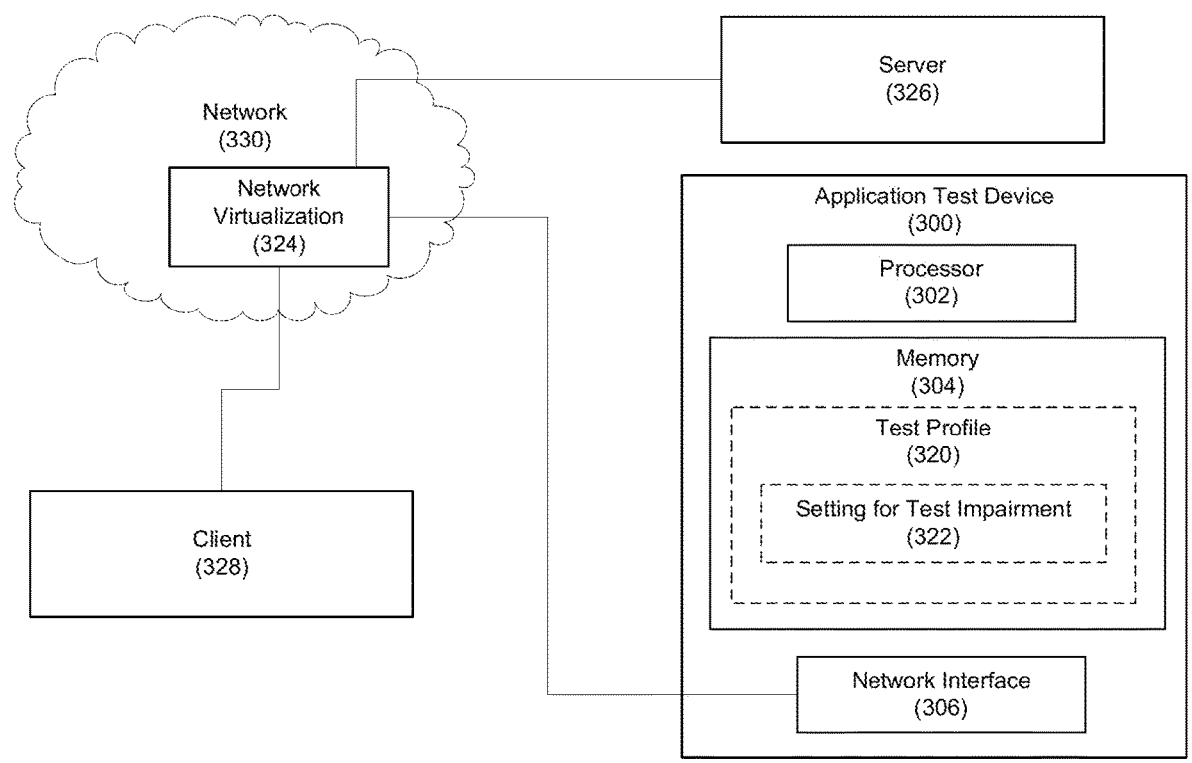
FIG. 6 is a diagram showing another example method of an application test device for compensating for actual impairment in a test execution employing artificial impairment where the application test device is shown in a distributed test environment, consistent with the disclosed implementations.

FIG. 6 is a diagram showing another example method of an application test device for compensating for actual impairment in a test execution employing artificial impairment where the application test device is shown in a distributed test environment, consistent with the disclosed implementations. As shown in FIG. 6, the application test device (300) may be physically located at any site remove from both the client (328) and the server (326) involved in the text execution of an application under test. The client (328), server (326) and application test device (300) all communicate via a computer network (330).

As described above, the application test device (300) includes a processor (302), memory (304) and a network interface (306) for communicating with the network (330). The application test device (300) may also use a network virtualization (324) which is a virtualized view of the network (330) for purposes of testing the application under consideration. As indicated above, the network virtualization (324) may include a network virtualization point from which server-side versus client-side impairment is measured.

In this example, the memory includes a test profile (320). The test profile (320) governs how a test execution of the application under test should be conducted, including any specified test impairment as described herein. Where a test impairment is specified, the memory may further include a setting (322) determining whether the test impairment is to be applied independently on a server or client side, or on both, during the test of the application. As indicated above, the processor (302) may be further programmed to measure the actual impairment by averaging impairment values determined in a number of sessions in the distributed environment. This may include that the processor is further programmed to combine impairments measured on a client-side of a network virtualization with impairments measured on a server-side of the network virtualization to measure the actual impairment.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method performed by a system comprising a hardware processor, comprising:
   in a distributed test environment for a test execution of a program, measuring an actual impairment in communication of data in the distributed test environment;
   computing an artificial impairment based on subtracting the actual impairment from a test impairment that is to be artificially introduced into the test execution based on a test profile; and
   when performing the test execution of the program in the distributed test environment,
      introducing the artificial impairment into the distributed test environment, and
      simulating a real operating environment using an impairment that includes the introduced artificial impairment added to the actual impairment in the distributed test environment.

2. The method of claim 1, further comprising iteratively measuring values of the actual impairment in the distributed test environment and adjusting an amount of the artificial impairment introduced into the distributed test environment based on each respective value of the values of the actual impairment during the test execution of the program.

3. The method of claim 1, wherein the actual impairment comprises an actual latency in communication of data packets in the distributed test environment, and measuring the actual latency in the distributed test environment comprises:
   recording a transit timestamp for a data packet forwarded in the distributed test environment; and
   upon receipt of an acknowledgment message for the data packet, calculating a round-trip time based on the recorded transit timestamp.

4. The method of claim 1, wherein the actual impairment comprises an actual packet loss rate in communication of data packets in the distributed test environment, and measuring the actual packet loss rate in the distributed test environment comprises:
   recording a transit timestamp for a data packet forwarded in the distributed test environment; and
   upon failing to receive an acknowledgment message for the data packet within a pre-configured time-out, recording a packet loss event.

5. The method of claim 1, wherein the test execution of the program in the distributed test environment comprises a communication between a client and a server, the method further comprising:
   measuring a first impairment to the client from a network virtualization point in the distributed test environment; and
   measuring a second impairment to the server from the network virtualization point in the distributed test environment,
   wherein the actual impairment comprises the first impairment and the second impairment, and the artificial impairment introduced into the distributed test environment is applied to data transmissions at the client in the distributed test environment and data transmissions at the server in the distributed test environment.

6. The method of claim 1, further comprising:
   for a plurality of sessions, measuring respective actual impairments in the distributed test environment; and
   calculating the actual impairment based on an average impairment of the actual impairments in the plurality of sessions.

7. The method of claim 6, wherein the test execution of the program in the distributed test environment comprises a communication between a client and a server, the method further comprising, for each session of the plurality of sessions:
   measuring a first impairment to the client from a network virtualization point in the distributed test environment;
   measuring a second impairment to the server from the network virtualization point in the distributed test environment; and
   combining the first and second impairments before calculating the average impairment.

8. The method of claim 7, further comprising using half of the average impairment as the actual impairment to be subtracted from the test impairment used to send a data packet either to the client or the server.

9. A non-transitory computer-readable medium, comprising instructions that, when executed, cause a test device to:
   access a test profile to determine whether a test impairment is to be introduced artificially into a test execution of a program in a distributed test environment;
   responsive to the test profile directing introduction of the test impairment, measure an actual impairment in communication of data in the distributed test environment and subtract the actual impairment from the test impairment;
   separate from the actual impairment, introduce an artificial impairment into the test execution of the program in the distributed test environment, the artificial impairment being the actual impairment minus subtracted from the test impairment; and
   when performing the test execution of the program in the distributed test environment, simulate a real operating environment using a simulated impairment that includes the introduced artificial impairment added to the actual impairment in the distributed test environment.

10. The non-transitory computer-readable medium of claim 9, wherein the test profile indicates whether the test impairment is to be applied for a server-side transmission independent of a client-side, for a client-side transmission independent of a server-side, or for both the sever-side transmission and the client-side transmission.

11. A system comprising:
a processor;
a non-transitory storage medium storing instructions executable on the processor to:
measure an actual impairment of packets communicated in a distributed test environment; and
during a test execution of a program in the distributed test environment:
compute an artificial impairment based on subtracting the actual impairment from a specified test impairment,
selectively introduce the artificial impairment into communication of packets in the distributed test environment, and
simulate a real operating environment using an impairment that includes the introduced artificial impairment added to the actual impairment in the distributed test environment.

12. The system of claim 11, wherein the instructions are executable on the processor to receive a test profile including the specified test impairment.

13. The system of claim 12, wherein the instructions are executable on the processor to receive a setting determining whether the specified test impairment is to be applied independently on a server or a client during the test execution of the program.

14. The system of claim 11, wherein the instructions are executable on the processor to measure the actual impairment by averaging impairment values determined in a plurality of sessions in the distributed test environment.

15. The system of claim 14, wherein the instructions are executable on the processor to combine impairments measured on a client-side of a network virtualization point with impairments measured on a server-side of the network virtualization point to measure the actual impairment.

16. The method of claim 1, wherein the test execution of the program in the distributed test environment comprises a communication between a client and a server, and wherein the artificial impairment introduced into the distributed test environment is applied to data transmissions at the client in the distributed test environment or data transmissions at the server in the distributed test environment.

17. The method of claim 1, wherein the distributed test environment simulates the real operating environment using a network virtualization that includes the impairment including the introduced artificial impairment added to the actual impairment.

18. The method of claim 17, wherein the impairment simulates the test impairment specified by the test profile.

19. The non-transitory computer-readable medium of claim 9, wherein the distributed test environment simulates the real operating environment using a network virtualization that includes the simulated impairment including the introduced artificial impairment added to the actual impairment.

20. The system of claim 11, wherein the distributed test environment simulates the real operating environment using a network virtualization that includes the impairment including the introduced artificial impairment added to the actual impairment.

* * * * *